(12) United States Patent
Kleo et al.

(10) Patent No.: US 9,006,751 B2
(45) Date of Patent: Apr. 14, 2015

(54) LUMINOUS VEHICLE GLAZING AND MANUFACTURE THEREOF

(75) Inventors: Christophe Kleo, Attichy (FR); Bastien Grandgirard, Marqueglise (FR); Alexandre Richard, Paris (FR); Adele Verrat-Debailleul, Villers sur Coudun (FR)

(73) Assignee: Saint-Gobain Glass France, Courbevoie (FR)

( * ) Notice: Subject to any disclaimer, the term of this patent is extended or adjusted under 35 U.S.C. 154(b) by 188 days.

(21) Appl. No.: 13/575,407

(22) PCT Filed: Jan. 24, 2011

(86) PCT No.: PCT/FR2011/050126
§ 371 (c)(1),
(2), (4) Date: Oct. 3, 2012

(87) PCT Pub. No.: WO2011/092420
PCT Pub. Date: Aug. 4, 2011

(65) Prior Publication Data
US 2013/0033894 A1 Feb. 7, 2013

(30) Foreign Application Priority Data

Jan. 26, 2010 (FR) .................................. 10 50526

(51) Int. Cl.
| | |
|---|---|
| *H01L 27/15* | (2006.01) |
| *H01L 21/00* | (2006.01) |
| *B32B 17/10* | (2006.01) |

(Continued)

(52) U.S. Cl.
CPC .......... *B60Q 1/268* (2013.01); *B32B 17/10036* (2013.01); *B32B 17/10541* (2013.01); *B32B 17/10761* (2013.01); *B60Q 3/0213* (2013.01); *G02B 6/0091* (2013.01); *G02B 6/0095* (2013.01)

(58) Field of Classification Search
USPC ...................... 438/23–31, 46, 47; 257/80–86, 257/E33.001–E33.077
See application file for complete search history.

(56) References Cited

U.S. PATENT DOCUMENTS

| | | | | |
|---|---|---|---|---|
| 4,960,631 | A | * | 10/1990 | Walters et al. ................. 428/192 |
| 6,131,563 | A | * | 10/2000 | Bonnetin et al. ............ 126/373.1 |

(Continued)

FOREIGN PATENT DOCUMENTS

| | | |
|---|---|---|
| FR | 2 895 781 | 7/2007 |
| WO | 2006 137660 | 12/2006 |
| WO | 2008 090646 | 7/2008 |

OTHER PUBLICATIONS

French Search Report Issued Sep. 21, 2010 in FR 10 50526 Filed Jan. 26, 2010.

(Continued)

*Primary Examiner* — Calvin Lee
(74) *Attorney, Agent, or Firm* — Oblon, McClelland, Maier & Neustadt, L.L.P.

(57) ABSTRACT

A luminous vehicle glazing containing: a first sheet having a first and a second main face; a peripheral light source, the emitting face facing an injection side, which is a side of the second face; a surface diffusion extractor, which extracts the guided light via the first and/or the second main face, or a volume diffusion extractor in the first sheet; a fluid-tight cap, which covers the peripheral light source and is impermeable to liquid water or water vapor, wherein the cap is a facial cap, faces the second face, joined by a fastening element, and associated with an interfacial sealing element.

25 Claims, 8 Drawing Sheets

(51) Int. Cl.
  *B60Q 1/26* (2006.01)
  *B60Q 3/02* (2006.01)
  *F21V 8/00* (2006.01)

(56) References Cited

U.S. PATENT DOCUMENTS

| | | |
|---|---|---|
| 6,305,109 B1 | 10/2001 | Lee |
| 2009/0174300 A1 | 7/2009 | Jousse et al. |
| 2009/0225565 A1 | 9/2009 | Zimmermann et al. |
| 2009/0225566 A1 | 9/2009 | Zimmermann et al. |
| 2010/0073959 A1 | 3/2010 | Hamada |
| 2012/0320621 A1* | 12/2012 | Kleo et al. .................. 362/558 |

OTHER PUBLICATIONS

International Search Report issued Oct. 26, 2012 in PCT/FR2011/050126 (with English-language translation).
U.S. Appl. No. 13/575,406, filed Sep. 6, 2012, Kleo, et al.

* cited by examiner

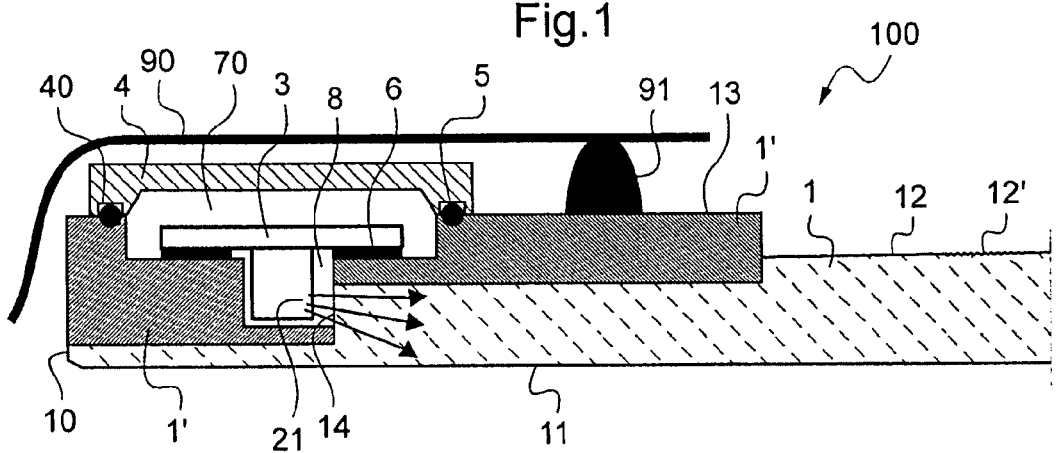
Fig.1
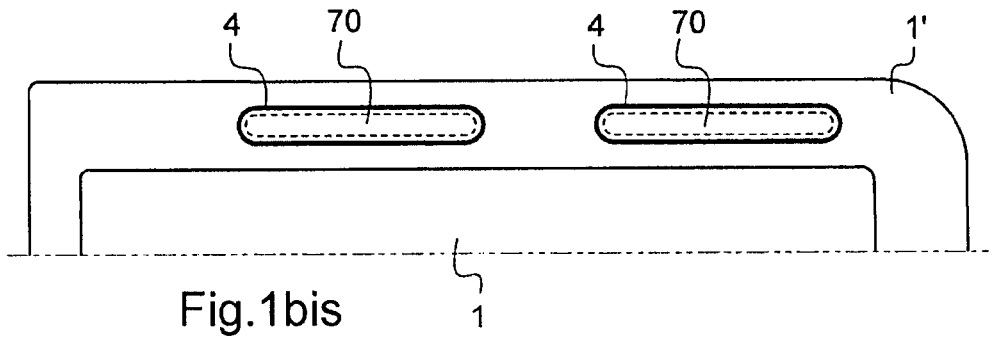
Fig.1bis
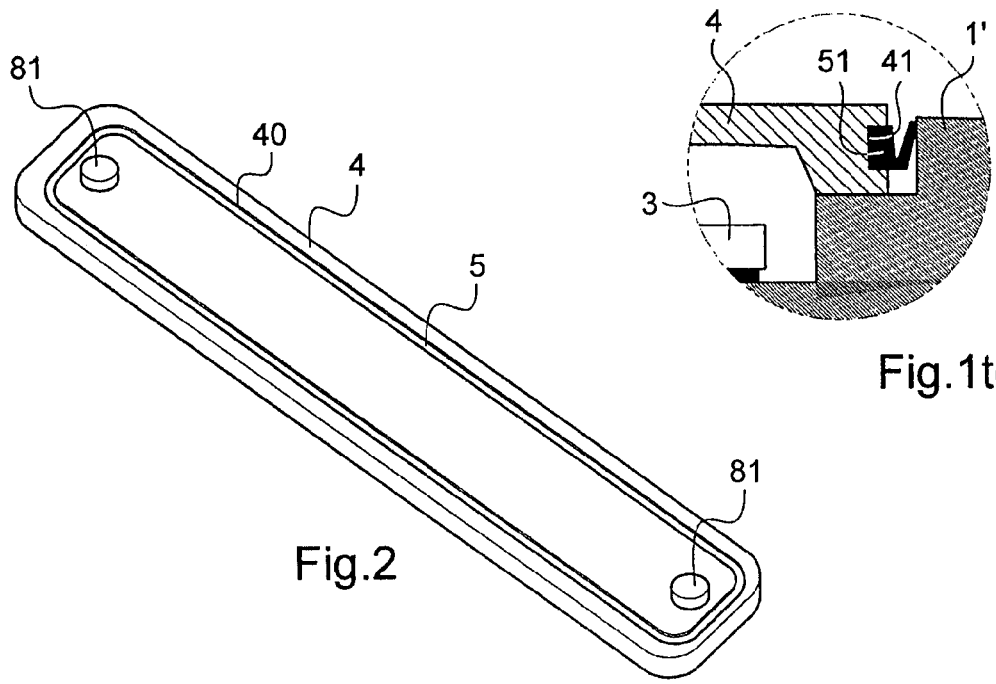
Fig.2
Fig.1ter

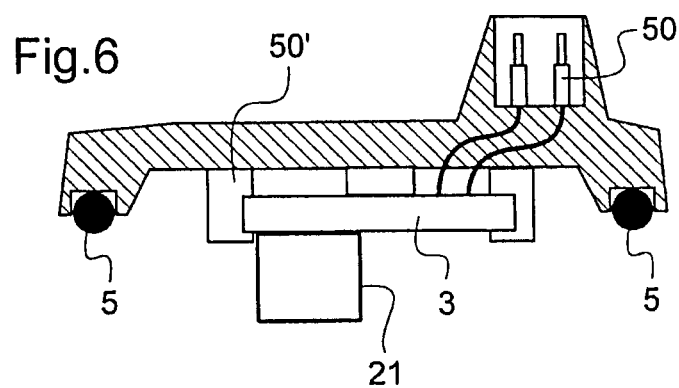
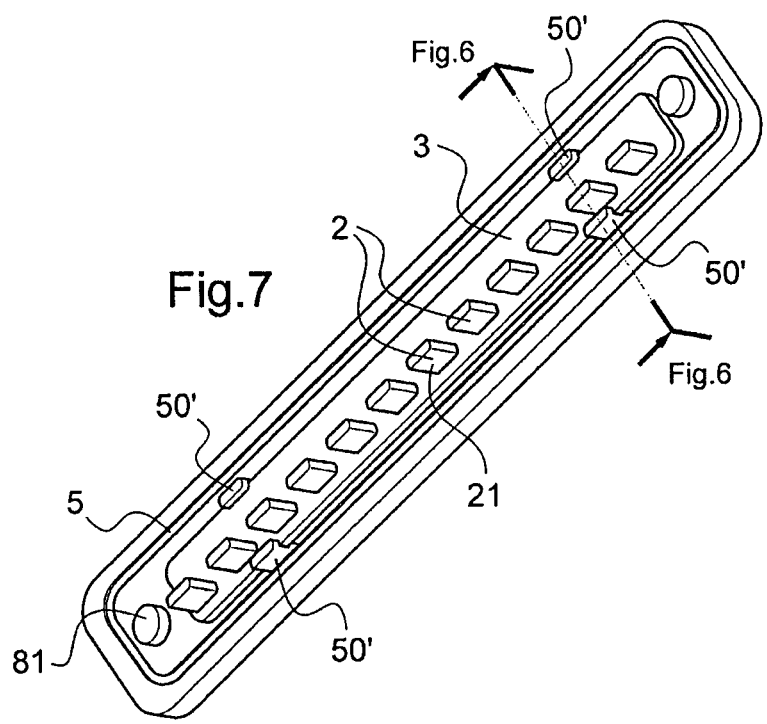
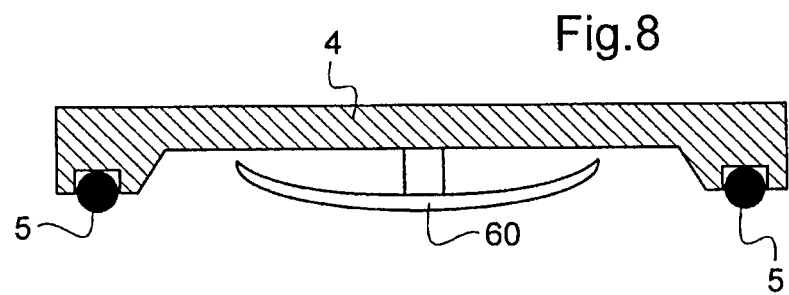

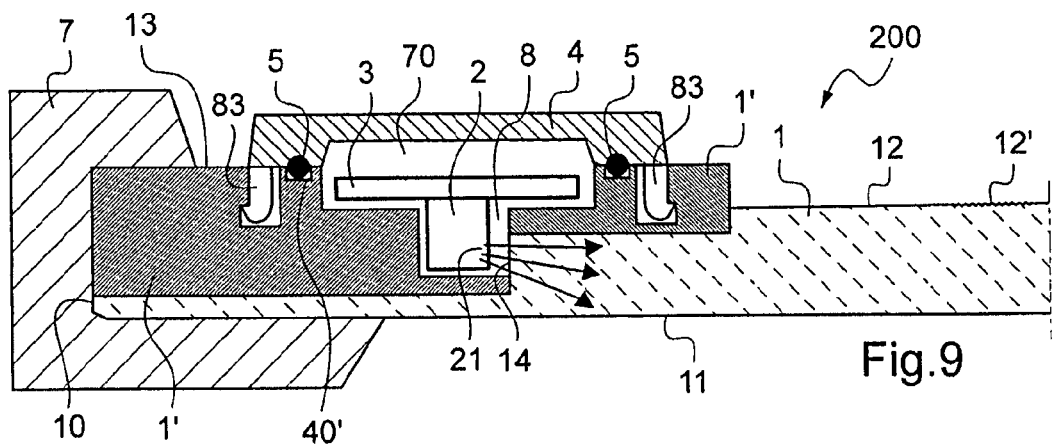
Fig.9
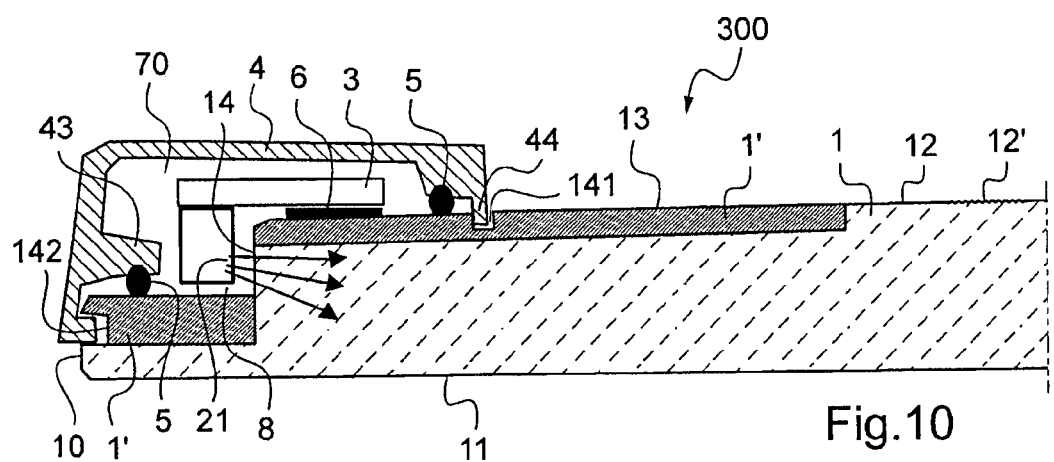
Fig.10
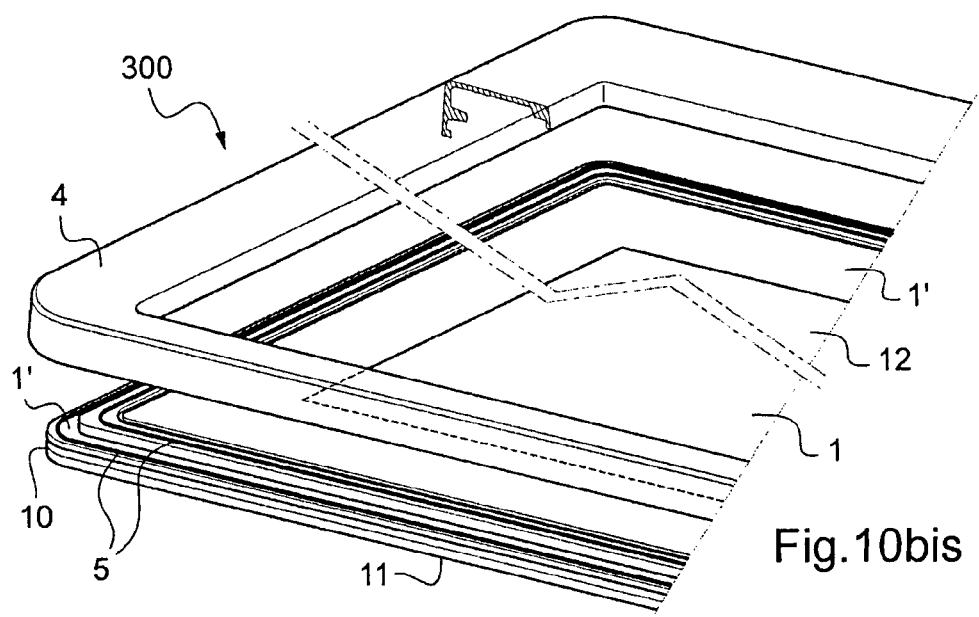
Fig.10bis

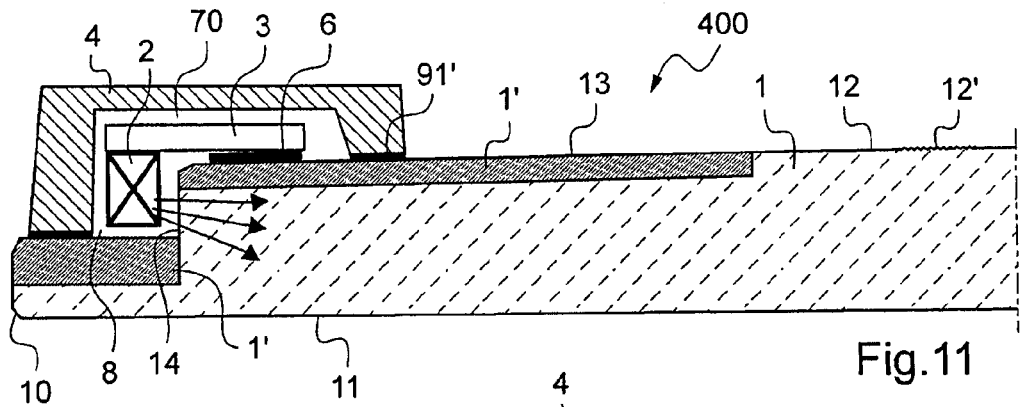
Fig.11
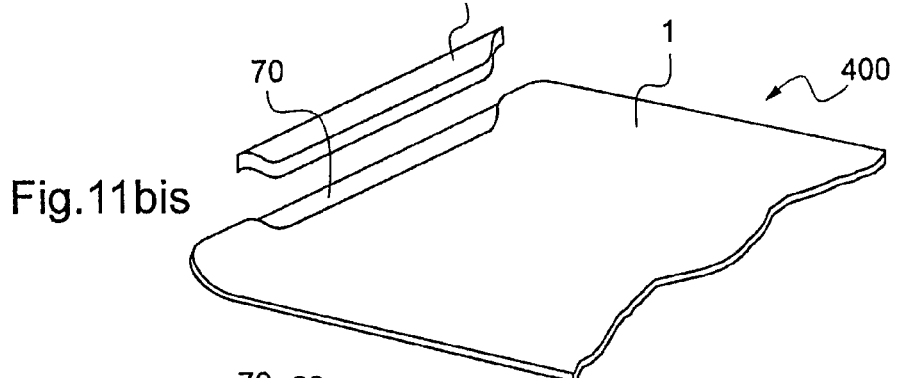
Fig.11bis
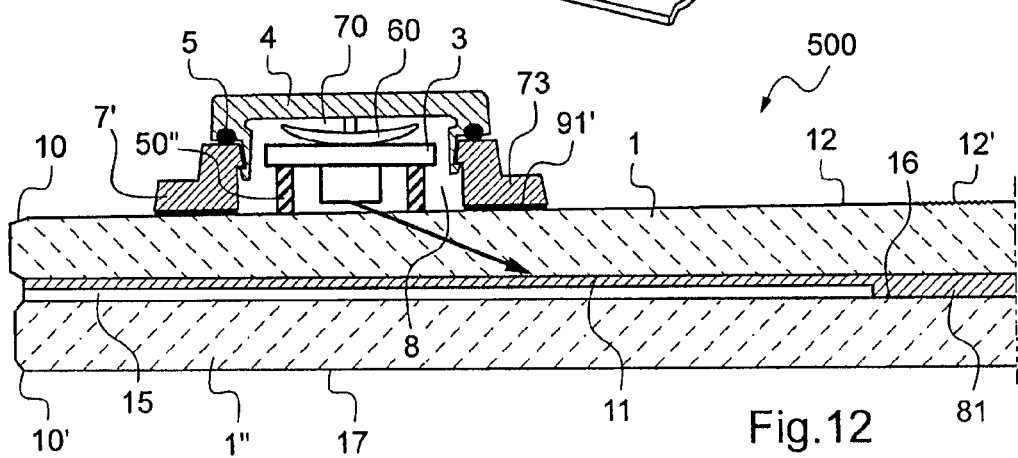
Fig.12
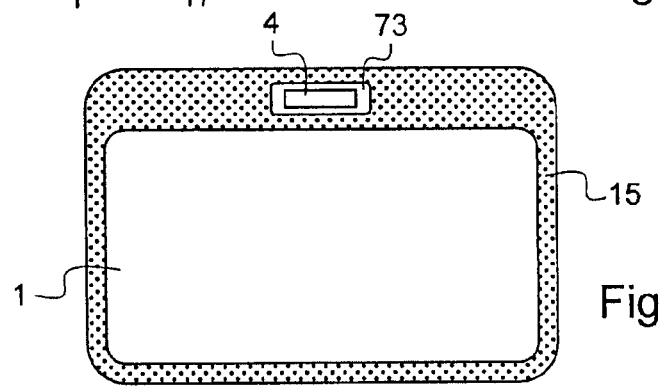
Fig.12bis

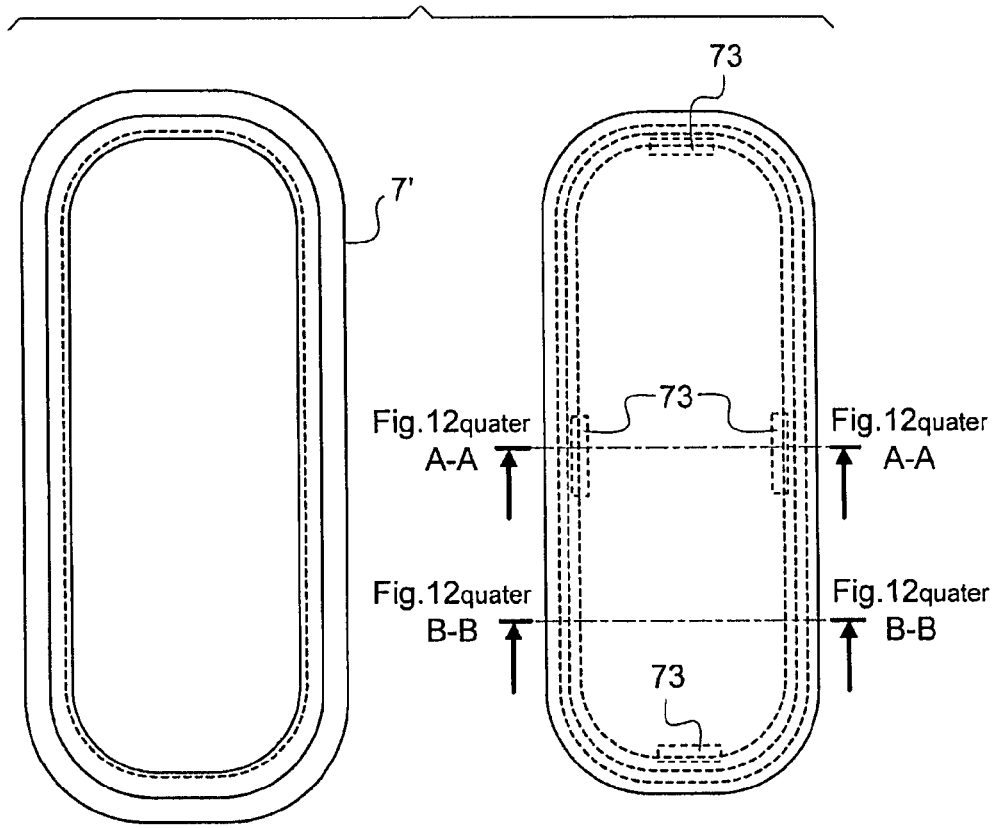
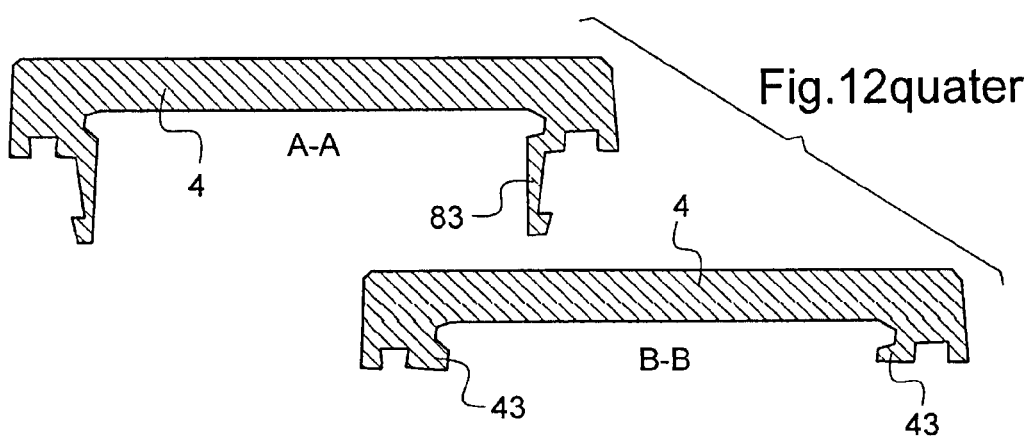

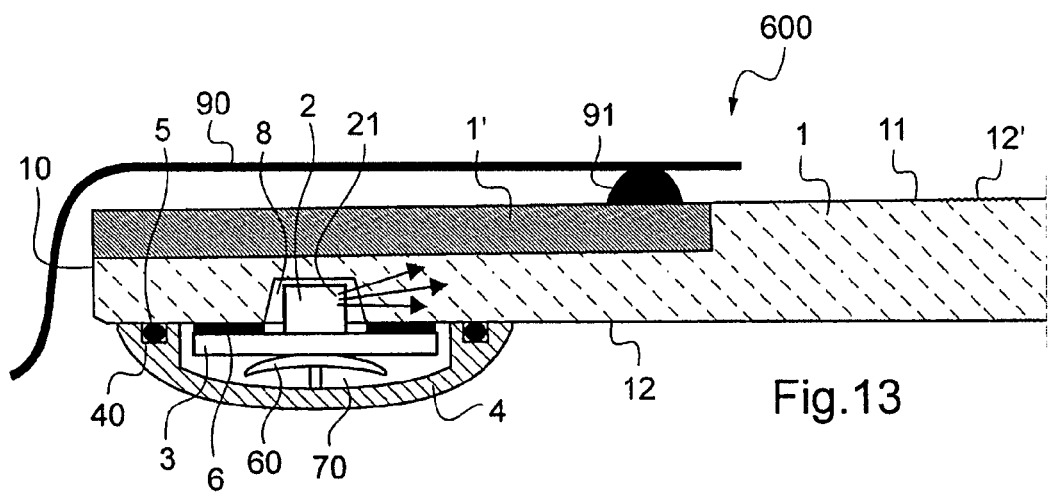
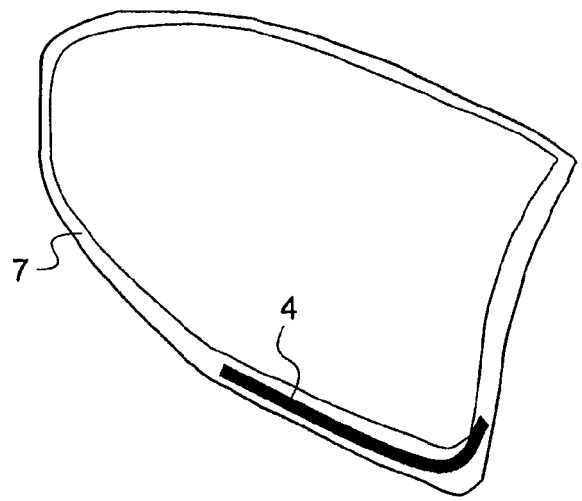
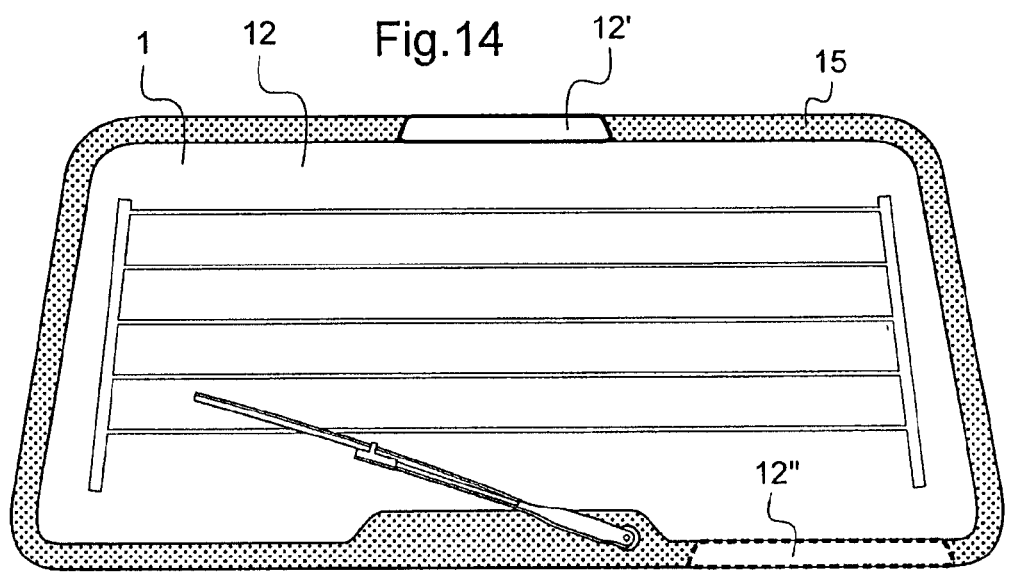

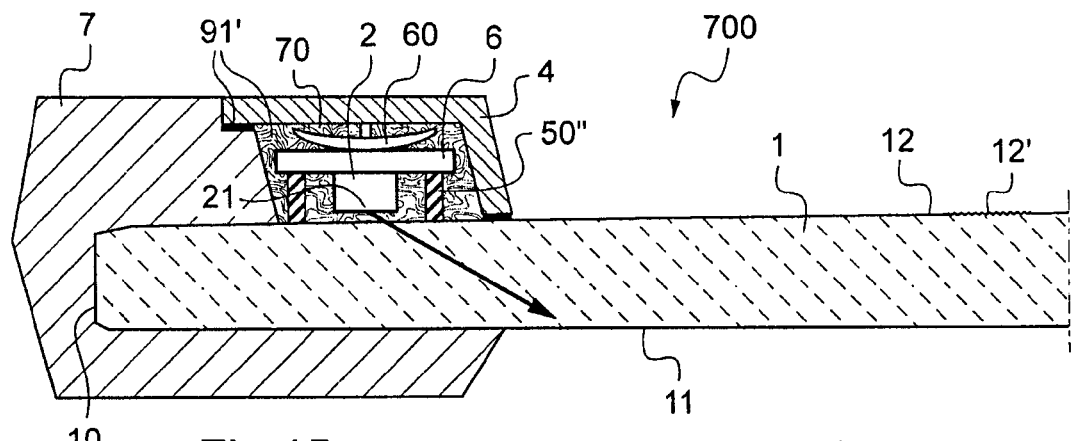
Fig.15
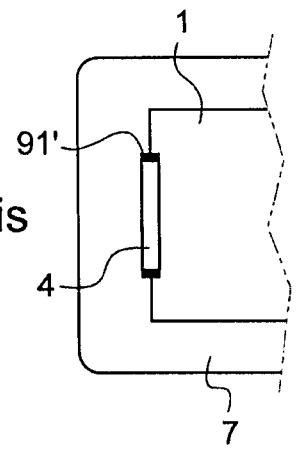
Fig.15bis
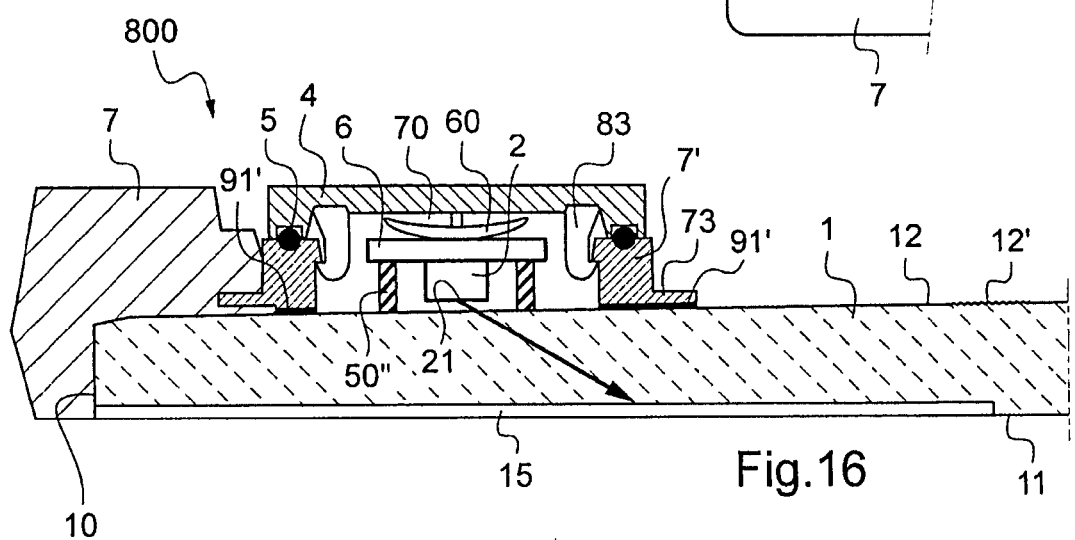
Fig.16
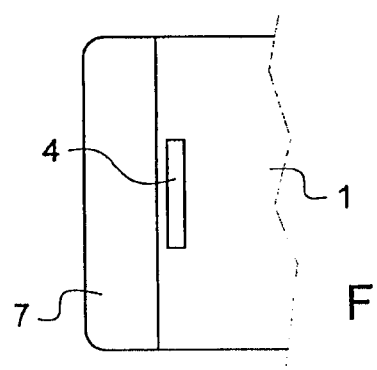
Fig.16bis

LUMINOUS VEHICLE GLAZING AND MANUFACTURE THEREOF

The present invention relates to vehicle glazings, and in particular luminous vehicle glazings, particularly having light emitting diodes, and the method for manufacturing such vehicle glazings.

Vehicles increasingly make use of light emitting diodes (LEDs).

Document WO2006128941, for example, proposes a sun roof with uniform light emission on the surface by light emitting diode(s). This roof comprises a laminated structure which, as shown in FIG. 8, is composed of an outer light extractor sheet, a central transparent light guide sheet, and an inner light diffuser sheet. The light source is a plurality of light emitting diodes mounted on a lateral support fixed to the edge of the inner and outer sheets, while a hole is made in the central sheet to accommodate the diodes.

The sun roof is fastened by bonding the peripheral edges of the outer sheet to the roof structure. The diodes and the peripheral bonding zone are masked by the internal lining.

The invention proposes to broaden the available range of luminous vehicle glazings.

The present invention relates in fact to a luminous vehicle glazing with an ecological and efficient light source (light emitting diodes, optical fiber(s) coupled with diodes, for example), suitable in particular for any roof configuration, and particularly roofs mounted via the exterior on the carbody roof, opening or fixed roofs.

For this purpose, the luminous vehicle glazing must be durable, compact, robust, while remaining simple, thereby meeting the specifications imposed by vehicle manufacturers.

The present invention also relates to a luminous vehicle glazing that meets the industrial requirements (in terms of output, hence of cost, production rate, automation, etc.), thereby making low-cost production possible without sacrificing performance.

For this purpose, the invention proposes a luminous vehicle glazing comprising:

a first sheet of mineral or organic glass having a first main face and a second main face and an edge, a peripheral light source with an emitting face selected from an optical fiber and light emitting diodes each comprising a semiconductor chip on (at least) one support section of the diodes (the section and diode assembly being routinely called a diode array), the emitting face facing a side of the second face called injection side (in contact or not with the second face) for a propagation of the injected visible and/or ultraviolet called UV light in the thickness of the first sheet, the first sheet then playing the role of a guide of the injected light, (the injection side optionally being partly recessed in its thickness or even having a setback), to form at least one luminous zone:

means for extracting the guided light via the first and/or the second main face, which are surface diffusion means of the first and/or the second main face or volume diffusion means in the first sheet, and/or when the injected light is (in particular) UV, means for converting the UV light to visible light via the first and/or the second main face, which are luminophores particularly on the first and/or the second main face (accordingly the extraction face), an optional added peripheral functional element (hence distinct from the first sheet), bonded to the first sheet (particularly by an inner face and the element having in particular a free outer face), which is fluid-tight, impermeable in particular to liquid water or even water vapor, (the functional element being for example adjacent to the injection side), in particular a functional element which is selected from an overmolding or a preassembled element, (metal or polymer, preferably selected from an encapsulate, an extrudate, a seal, in particular bonded to the first sheet)

a fluid-tight cap for covering the source, impermeable in particular to liquid water or even water vapor, the cap, called a facial cap, that is to say, essentially (or entirely) facing (above) the second face, joined by fastening means to the first sheet (preferably by the second face), particularly of organic glass and/or to a connecting part (7') bonded to the first sheet, and optionally to the functional element (by its outer face)

the cap having a general what is called inner face oriented toward the second face, the cap being associated with an interfacial element, for the fluid-tight interfacial sealing, impermeable in particular to liquid water or even water vapor, which is arranged between the cap and the connecting part and optionally between the cap and the functional element (with a side called the bearing side)

or integrated with the cap, or integrated with the connecting part or integrated with the first sheet.

Thus the present invention proposes a durable luminous glazing, even when the glazing is not protected by the body, thanks to the simple and appropriate sealing means, eliminating fluid diffusion pathways.

The sealed cap associated with the interfacial sealing is easy to (re)position, removable (demountable, replaceable at minimum cost) if necessary:

to replace the light source (LEDs, etc.) and/or their electronic control during repair, or recycling or even to contend with new optical performance requirements desired by the client (change in color(s), power, frequency, control) or by new standards imposed, and/or to add sources (LED and/or optical fiber) and/or electronic controls in a glazing with the cavity and such sealing means according to the invention.

The invention thereby facilitates the modularity of the lighting proposed on the glazing (glazing that is illuminating or can become such, variation in color, intensity, etc.)—with regard to the logistic management of the production flows (advance assembly rather than at customer's request).

The invention reduces the impact of the integration of the source (LED, etc.) on the choice of the methods and materials, and offers a possibility of independence from a production technology, because it offers a broad range of feasible encapsulation or pre-assembly solutions.

Furthermore, the solution according to the invention is flexible, because the cap can be installed independently of the source (for example, of the LED array or arrays).

The invention makes it possible to manufacture a luminous vehicle glazing with an optional functional element, added to the glazing in a routine manner, in particular manufactured by the usual techniques (extrusion, molding, etc.), the functional element being modifiable appropriately (recessed) to serve as capping support in post-assembly.

In certain configurations, the cap is not visible after assembly on the vehicle body.

Furthermore, the cap and the interfacial sealing element according to the invention are useful in particular for protecting the source against moisture, particularly the chips, to prevent pollution of the coupling space (dirt, organic pollution, mold, etc.) and preferably against cleaning products, or against washing by high-pressure jet. This protection must be permanent.

The wet plaster test can be performed to qualify the long-term moisture-tightness. For example standard D47 1165-H7 used in the automobile field describes the H7 wet plaster test.

This test consists in embedding the part to be tested in cotton soaked with deionized water and in enclosing the whole in a hermetically sealed bag, and then placing it in an oven at 70+/−2° C. for 7 days. The parts are then taken out, stripped of the soaked cotton and placed at 20° C. for two hours. The parts can finally be observed and tested mechanically or functionally to assess the effect of the moisture on the system. This test corresponds to several years of natural aging in a humid and hot environment.

A high-pressure water jet cleaning test can also be used to test the resistance to washing by high-pressure cleaner D25 5376 used in the automobile field: pressure up to 100 bar with a nozzle/body distance up to 100 mm.

The solution according to the invention, implementing a series of means for sealing, is preferred to a total monolithic encapsulation, particularly of overmolding (encapsulate) or by a coating of glue, adhesive, in which the light source (such as the LED arrays, for example) would be entirely encapsulated, a solution that makes the light source difficult to access at the risk of damaging it.

Furthermore, total encapsulation is delicate and can damage the source, in particular the LEDs (and/or their electronic circuit) already mounted, incurring high scrap costs, unless precautions which complicate the manufacture are taken.

Similarly, the integration of the source such as an LED array is difficult or even impossible in the case of an extrusion or a molding due to the risk of deterioration of the light function.

In an advantageous embodiment, simple to execute, the first sheet is made from glass, in particular organic glass, particularly of PC, with a blind hole in its thickness, of the second face, for example a setback, to house the source facing the injection side.

In a sheet of organic glass, in particular of plastic (PC, etc.), it is in fact possible to make a hole or a groove more easily than in a mineral glass sheet, in particular toughened.

In a preferred embodiment, the hole is on the entire perimeter of the second face and the cap forms a frame, in particular integrating said fastening means (by screwing or clipping, etc.).

The cross-section of the cap may then be for example an L-shape, U-shape, may integrate said fastening means, for example of the screwing, clipping, riveting, bonding type.

The glazing comprises the glazing comprises an element for masking the source and any interfering light (particularly at the face opposite the extraction face, close to the injection zone), and/or for masking the fastening of the glazing to the vehicle body by the second face, the masking element possibly being
    a part of the functional element, in particular a polymer encapsulation (sufficiently opaque, black),
    and/or a sufficiently opaque enamel, on the periphery of the second face and/or on the first face or a face of an added sheet film facing the first face in particular when the functional element is one-sided or two-sided,
    and/or a reflecting surface (layer, etc.) on the periphery of the second face and/or on the first face or an added face facing the first face.

In particular the first sheet is organic, transparent and opaque bimaterial, particularly of polycarbonate:
    the opaque zone of the first sheet, on the periphery of the second face and/or on the first face, forms a masking of the source and of any interfering light (close to the injection),
and/or forms a masking of the fastening of the glazing to the vehicle body by the second face.

Advantageously, the glazing may comprise a plurality of sources, in particular groups of said diodes distributed on several sections (hence several diode arrays),
    a cap and an interfacial sealing element are provided for each diode group (array)
    and/or the cap and the interfacial sealing element being common to a plurality of diode groups (arrays).

Preferably, the distance between the inner face of the cap and the first face is shorter than 10 mm.

Preferably, the distance between the outer face of the cap and the injection side or edge is shorter than 15 mm. The thickness of the cap may be less than 5 mm.

Furthermore, the space of the radiation emitted before injection, of said coupling space, naturally varies according to the source radiation diagram, defined by a main emission direction and an emission cone.

A material may be provided for filling the coupling space, which material is transparent to said radiation(s), adhesive or not, in particular:
    a foam, a thermoplastic resin,
    an adhesive material, such as glue, embedding the chips and securing the chips to the glazing,
    a two-sided adhesive, bonded to the chips and to the support by an adhesive face and bonded to the glazing by the other adhesive face.

As adhesive materials (polymers, etc.) performing a short-term sealing function if necessary, mention can be made of:
    glue crosslinkable with UV,
    a strip (acrylic, PU, etc.) made adhesive with acrylic glue,
    a transparent glue, PU, silicone, acrylic,
    a thermoplastic resin: polyvinylbutyral (PVB), ethylene/vinyl acetate copolymer (EVA), etc.

However, the invention serves to avoid the addition of a supplementary element as mentioned above (filling and/or adhesive and/or sealing material) to make the optical coupling between the LEDs (bare or pre-encapsulated) and the glazing. Such elements incur an additional cost and are liable to alter the color of the light.

It is preferable for the space of the radiation emitted before injection, called the coupling space, to be gaseous (one or more gases, for example air) and/or for the fluid-tight local interfacial sealing element to be on the periphery of the inner face of the cap or on one side of the cap, in particular the fluid-tight interfacial sealing element forms a strip.

The diodes may be (pre-)encapsulated, that is to say, comprising a semiconductor chip and an envelope, for example an epoxy type or PMMA resin, encapsulating the chip and which has many functions: diffuser or focusing element, wavelength conversion. The envelope is common or individual.

The diodes may preferably be single semiconductor chips, for example having a size of about 100 μm or 1 mm.

The diodes may optionally comprise a protective envelope (temporary or not) to protect the chip during handling operations or to improve the compatibility between the chip materials and other materials.

The diode may be selected in particular from at least one of the following light emitting diodes:
- a side emission diode, that is to say, emitting parallel to the (faces of) electrical contacts, with a side emitting face with regard to the support,
- a diode whose main emission direction is perpendicular or oblique to the emitting face of the chip.

The emission diagram of a source may be Lambertian.

The glazing may thus integrate all the functionalities known in the field of glazing. Among the functionalities added to the glazing, mention can be made of: a layer that is hydrophobic/oleophobic, hydrophilic/oleophilic, photocatalytic antisoiling, stack reflecting heat radiation (solar control) or infrared radiation (low-emissive), antireflecting.

The support section may be a conventional PCB or may be metal. The support section may have a rectangular cross-section.

The total number of diodes, the power of the diodes are selected according to the size and location of the zones to be illuminated, the desired light intensity and the uniformity of light required.

The length of the support section varies according to the number of diodes and the extent of the area to be illuminated.

The LED support section has a length, for example, of about 20 cm. The number of LED arrays (section+LED) is preferably increased to cover the area.

For greater compactness and/or simplified design, the support section may further have one or more of the following features:
- it may be thin, in particular having a thickness of not more than 1 mm, or even 0.1 mm,
- it may have a metal surface coating for electrical conduction.

A plurality of identical or similar diode support sections may be provided instead of a single support section, particularly if the zones to be illuminated are separated by long distances or to illuminate a wide zone.

A support section may be provided having a given reference size multiplied according to the size of the glazing and the requirements.

For greater compactness and/or to increase the clear zone of the glass, the distance between the chip bearing portion and the first sheet is preferably not more than 5 mm, and preferably the distance between the chips and the first sheet is not more than 2 mm.

The source may also be fastened to the glazing outside the coupling space, particularly outside the injection side, and for the diodes, by fastening the support section, particularly by bonding or two-sided adhesive or clipping, to one of the faces of the first sheet, particularly the second face, or to the inner face of the cap.

The "permanent" cap fastening means may be selected from bonding, welding, or even heading, according to the type of part.

The "permanent" interfacial sealing means may be selected from bonding, welding, and also fastening means.

However, to facilitate disassembly or even replacement of the cap, the interfacial sealing element, preferably on the periphery of the cap, is a reversible glue, forming part of or constituting said cap fastening means which are accordingly reversible, preferably a glue strip arranged in a gasket particularly in contact with the inner face of the cap or the connecting part (by its free outer face) or the second face, particularly epoxy bicomponent glue.

As reversible glue, mention can be made of epoxys, particularly bicomponent epoxys, for example products of the ElectRelease™ range from EIC Laboratories.

Alternatively or cumulatively, to facilitate the disassembly and reassembly, the interfacial sealing element, preferably on the periphery of the cap, is a compressed material, the compressive sealing of the material being provided by a closure force of said cap fastening means, particularly the interfacial sealing element is selected from:
- a polymer seal for example made from TPE, EPDM, in particular an O-ring, with lip seal(s), the seal particularly being in a groove of the cap (on the inner face of the cap or in a groove on a side of the cap) or of the second face or of the connecting part,
- a sealing section on the connecting part, selected from polymer, for example lip(s), particularly made from EPDM, or on the inner face or a side of the polymer cap;
- a foam, optionally made adhesive (to the cap or to the connecting part or to the second face), particularly acrylic foam, PU, rubber (EPDM, etc.), thermoplastic elastomers, TPE, polyester, in particular monocomponent polyester rubber such as the Dynafoam product sold by Saint-Gobain Performance Plastics. This makes the use of a sealing adhesive unnecessary.

In a first advantageous embodiment, preferably related to compressive sealing, the fastening means are reversible, and are selected from:
- clipping means, point (pins, etc.) or extended (that is to say, extending over the whole length of the cap), arranged on the cap (inner face), preferably forming an integral part of the cap, (preferably in the sealing zone defined by the interfacial sealing element), and particularly received for clipping in one or more host zones in the first, in particular organic, sheet, and/or of the connecting part and optionally further received in the functional element;
- clipping means, of the hook type, forming an integral part of the cap, preferably outside in the sealing zone and in particular received in one or more host zones of the first, in particular organic, sheet, and/or of the connecting part and optionally further received in the functional element;
- screw means (such as screws, bolts) for example extending beyond the inner face (for example housed in perforations of the cap or forming an integral part of the facial cap, optionally via blind holes), preferably in the sealing zone, between the interfacial sealing element and the cavity edge.

This makes it possible to eliminate the need for a fastening adhesive.

The connecting part preferably forms a recessed single-face part having a closed contour such as a frame.

The cap may be a part having a substantially planar general shape. The cap may be a trim (particularly having the color of the vehicle body), or be masked after fastening the glazing to the body, the cap for example along an edge or forming a frame.

The cap may further comprise means for securing said section and/or a cavity for the passage of the connections and/or means for positioning the support section of the diodes (for example grooves, local stops, studs).

The cap may further comprise
- the optional integration of electrical power supply wires and connections (for example from one diode array to the next) prior to the integration of the diodes (overmolding of wires, or provide grooves, etc.),
- to facilitate the output of the wires with regard to the main power supply connectors (which may be the battery, a photovoltaic source, etc.) in the capping zone by a built-in pin.

Preferably, the transmission factor of the first sheet around the chip radiation peak (perpendicular to the main faces) is 50% or higher, even more preferably 70% or higher, and even 80% or higher.

The glazing may have what is called a protective layer (a sheet, film, deposit, etc.) on either of the first or second faces or extending on said face. This layer may have a dual function:

light diffusion (for example flexible film of PU, PE, silicone optionally bonded by acrylic), protection from radiation (IR, UV): solar control, low emissivity, etc., scratchproof, esthetic (tinted, patterned, etc.).

Rounded sides may be preferably provided for the coupling side or sides of the first sheet. In particular, in the case in which the emitted radiation space is air, it is possible to exploit the refraction at the air/first sheet interface having an appropriate geometry (rounded side, even beveled, etc.) thereby serving to focus the rays in the first sheet.

The glass may optionally previously have undergone a heat treatment by hardening, annealing, toughening, bending.

The glazing is single, the first sheet being made of mineral or organic glass, in particular of PC, PMMA, PU, ionomer resin, polyolefin, optionally bimaterial.

The glazing may be laminated (several sheets) formed:

from a first transparent sheet, mineral (float, etc.) or organic (PC, PMMA, PU, ionomer resin, polyolefin) glass, thick or thin, from a lamination interlayer of a given laminating material, from a second sheet (opaque or not, transparent, tinted, of mineral glass, or organic glass with various functionalities: solar control, etc.).

As a common lamination interlayer, mention can be made of flexible PU, a plasticizer-free thermo plastic such as ethylene/vinyl acetate copolymer (EVA), polyvinylbutyral (PVB). These plastics have a thickness, for example, between 0.2 mm and 1.1 mm, in particular between 0.38 and 0.76 mm.

The first sheet/interlayer/second sheet may in particular be selected as:

mineral glass/interlayer/mineral glass, mineral glass/interlayer/polycarbonate, polycarbonate (thick or not)/interlayer/mineral glass.

In the present description, unless otherwise specified, glass means mineral glass.

The side of the first sheet can be cut out (trimming with recesses before quenching) from a single or laminated glazing or from a double glazing to accommodate the diodes therein.

The first and/or second sheets may have any shape (rectangular, square, round, oval, etc.), and may be planar or cambered.

The first sheet may preferably be of soda lime glass, for example PLANILUX glass from SAINT GOBAIN GLASS.

The second sheet may be tinted, for example made of VENUS glass from SAINT GOBAIN GLASS.

The laminated glazing comprises a second sheet, in particular of mineral or organic glass, which is laminated by a lamination interlayer to the first sheet and preferably the edge of the first sheet comprises a marginal through cavity in the thickness where the source is housed, or the second sheet extends beyond the injection side of the first sheet, creating a side setback of the glazing.

The glazing may be an insulating multiple glazing, under vacuum, in particular double or triple glazing formed:

from a first transparent sheet, mineral glass (float, etc.) or organic glass (PC, PMMA, PU, ionomer resin, polyolefin), thick or thin, from a second sheet spaced by a gas space (air or inert gas) (opaque or transparent, tinted, of mineral or organic glass having various functionalities: solar control, etc.), from an optional third sheet spaced by a gas space (air or inert gas) (opaque or transparent, tinted, of mineral or organic glass having various functionalities: solar control, etc.).

The glazing is a multiple glazing, in particular a laminated glazing, a vacuum or insulating double glazing, or even a triple glazing, the first sheet being an outer or central sheet of the triple glazing.

For light extraction, use is made of the diffusion means, formed either by surface treatment of the glass sheet such as sandblasting, acid attack, enameling or diffusing paste deposition, or by laser etching type treatment of the glass mass.

The diffusing layer may be composed of elements containing particles and a binder, the binder serving to aggregate the particles together. The particles may be metal or metal oxide particles, the particle size may be between 50 nm and 1 μm, and the binder may preferably be inorganic for heat resistance.

In a preferred embodiment, the diffusing layer consists of particles aggregated in a binder, said particles having a mean diameter of 0.3 to 2 microns, said binder being present in a proportion of between 10 and 40% by volume and the particles forming aggregates having a size between 0.5 and 5 microns. This preferred diffusing layer is particularly described in application WO0190787.

The particles may be selected from semi-transparent particles and preferably inorganic particles such as oxides, nitrides, carbides. The particles are preferably selected from oxides of silicon, aluminum, zirconium, titanium, cerium, or a mixture of at least two of these oxides.

For example, a diffusing inorganic layer about 10 μm thick is selected.

For greater compactness and/or to reduce or increase the clear zone of the window, the distance between the emitting face and the first sheet may be shorter than 2 mm. In particular, use can be made of smaller diodes, for example chips without lens and/or without pre-encapsulation, particularly about 1 mm wide, about 2.8 mm long, and about 1.5 mm high.

The optional functional element may have one or more standard functionalities for the vehicle glazing.

The functionality (single or multiple) of the functional element may be one or more of the following:

frame of the glazing (single-face, two-face, three-face), in particular having a width on the first face of 3 to 100 mm, thickness of 10 to 40 mm, and/or bearing part for fastening or centering elements (that is to say, for proper positioning of the glazing on the vehicle body during assembly of the glazing at the manufacturer), sealing part impermeable to fluid(s) (liquid water, water vapor, cleaning products, etc.) between the glazing and vehicle body, at least limiting the passage of the fluids between the glazing and the vehicle body, opaque and/or masking part, and/or (point) part for securing mechanical elements (side window holder, etc.).

The peripheral functional element is connected to the first sheet. The functional element may be an encapsulate, an extrudate, a preassembled seal (sealing strip), a molding, injection molding, etc.

The functional element is connected directly to the first sheet or indirectly, for example via a reinforcing, adhesive element.

The functional element can thus be connected to the glazing by any means:
- direct adhesion of the material (molded, etc.),
- pinching or toe-in,
- connecting means of the bonding type, etc.

The functional element may be single-sided, that is to say only:
- on the second face,
- on the edge of the first sheet in the case of a laminated glazing or a double or triple glazing (above all in buses and trains or even for air transport) on all or part of the glazing edge.

The functional element may be:
- two-sided: on the second face and on the edge or on the first face and on the edge,
- or three-sided: on the first face, on the edge of at least the first sheet (or of the glazing) and on the second face of the first sheet.

The functional element on the second face may serve to mask the source and even the interfering light.

The luminous vehicle glazing thus comprises a duplicate molded polymer functional element, and preferably between the encapsulation and the glazing, in particular of mineral glass, a layer of mono-, bi- or tricomponent primer, for example based on polyurethane, polyester, polyvinyl acetate, isocyanate.

As already observed, the functional element may be a polymer encapsulation, particularly 0.5 mm to several cm thick, obtained by overmolding.

In vehicle applications, the encapsulation material is generally black or dyed (for esthetic and/or masking purposes). The encapsulation may be of polyurethane, particularly PU-RIM (Reaction In Mold). Other overmolding materials are:
- flexible thermoplastics:
  - thermoplastic elastomer (TPE), in particular compounds based on styrene ethylene butadiene styrene SEBS/polypropylene (PP), thermoplastic TPU, polypropylene PP/EPDM,
  - polyvinyl chloride (PVC), ethylene propylene diene terpolymer (EPDM),
- rigid thermoplastics:
  - polycarbonate (PC), polymethyl methacrylate (PMMA), polyethylene (PE), polypropylene (PP), polyamide (PA66), acrylonitrile butadiene styrene (ABS), and their ABS-PC alloys, polystyrene (PS), acrylonitrile styrene acrylate ASA.

The overmolding material may be dyed, filled with glass fibers.

The layer of mono-, bi- or tricomponent primer is, for example, based on polyurethane, polyester, polyvinyl acetate, isocyanate, etc., for example 5 to 50 μm thick, between the encapsulation and the glazing in particular of mineral glass, because this layer promotes the adhesion to a mineral glass.

The functional element (duplicate molded) also provides a good esthetic finish and serves to integrate other elements or functions:
- overmolding of frames,
- reinforcing inserts or glazing fastening inserts, particularly for opening glazings,
- multi-lip (double, triple, etc.) sealing profile, crushed after assembly on the body,
- trim.

The duplicate molded functional element may have any shape, with or without lip.

A tubing, in other words a sealing profile with closed cells, can also be attached to the duplicate molded functional element.

Preferably for a roof, a flush encapsulation is carried out, that is to say, flush with one of the faces of the glazing, preferably the second face.

The luminous vehicle glazing may comprise a functional element which is a one-sided part on the second face, particularly an overmolding or a bonded part (seal, frame), a part with a support (X) for fastening a vehicle element to the glazing or the glazing to a vehicle element, along at least one injection side or even at least two opposite sides of the glazing.

The functional element may be a polymer seal, preferably of elastomer, in particular TPE (thermoplastic elastomer), or EPDM, a few mm thick (typically between 2 and 15 mm).

The seal may be made adhesive to be secure. The seal may preferably be secured simply by pinching or by toe-in or by clipping (2 half-frames for example). The seal may be one-sided, two-sided, three-sided. The seal may form a frame. The seal may have any shape: L, U, etc. The seal may be demountable at any time. It may comprise one or more lips which are stressed after fastening.

The functional element may be metal or polymer, polypropylene (PP), polyamide (PA66), polybutylene terephthalate (PBT), filled or not with glass fibers.

The luminous zone or zones (in particular peripheral along a side of the glazing or opposite or adjacent sides, in strip(s), framing the glazing) is formed an internal ambience lighting, an internal reading lighting (by side window, roof, etc.), a light display of internal and/or external indications.

The luminous zone or zones are in particular peripheral, in strip(s) surrounding the glazing.

The extraction/conversion of the radiation (and the type and/or position and/or number of diodes) is adjusted for:
- ambience, reading lighting, particularly visible inside the vehicle,
- light indications in particular visible from the exterior:
  - by remote-control activation: detection of the vehicle in a parking lot or other, door (un)locking indicator, or safety signaling, for example as rear stop lights,
- substantially uniform lighting on the entire extraction area (one or more extraction zones, common or distinct function).

The light may be:
- continuous and/or intermittent,
- monochromatic and/or multicolored.

Visible inside the vehicle, it may thus have a function of night lighting or of data display of all types, such as drawing, logo, alphanumeric signals or other signage.

As decorative patterns, one or more light strips, a peripheral light frame, can be formed for example.

A single extraction face can be provided (preferably inside the vehicle).

The insertion of diodes in these glazings allows for other signaling functionalities as follows:
- display of signal lamps intended for the vehicle driver or the passengers (example: engine temperature alarm lamp in the automobile windshield, indicator lamp of electric defrosting system, of windows, etc.), display of signal lamps intended for persons outside the vehicle (example: vehicle alarm-on indicator in the side windows), light display on the vehicle glazings (for example flashing light display on first aid vehicles, safety display with low electrical consumption indicating the presence of a vehicle in danger).

The glazing may comprise a control signal receiver diode, particularly infrared, to remote-control the diodes.

The glazing is intended for any vehicle:

side window of a land vehicle, in particular automobile, utility vehicle, truck, train, in particular with the functional element which is a securing part of a window raising system or with the trim cap, sliding or fixed roof of a land vehicle, in particular automobile, utility vehicle, truck, train, with a first optionally cambered sheet, in particular a laminated glazing, windshield of a land vehicle, in particular automobile, utility vehicle, truck, train, in particular with the light zone or zones (forming an "HUD" signal for example) in the enamel frame or nearby, rear window in particular in the enamel frame or nearby, window, windshield of an aerial vehicle, glazing for window, roof, of an aquatic vehicle, ship, submarine, double or triple glazing in a train, a bus.

The invention naturally also relates to a vehicle incorporating the glazing defined above.

Other details and advantageous features of the invention will appear from a reading of the examples of glazings according to the invention illustrated by the following figures:

FIGS. 1, 9, 10, 11, 12, 13, 15, 16 show partial schematic cross-sections of luminous vehicle glazings in various embodiments of the invention.

FIG. 1bis shows a partial schematic plan view of the luminous vehicle glazing in the embodiment of the invention in FIG. 1.

FIG. 1ter shows a partial schematic cross-section of the luminous vehicle glazing in an alternative of the embodiment of the invention in FIG. 1.

FIGS. 2 and 7 each show a schematic view from below of caps according to the invention.

Figure 3:
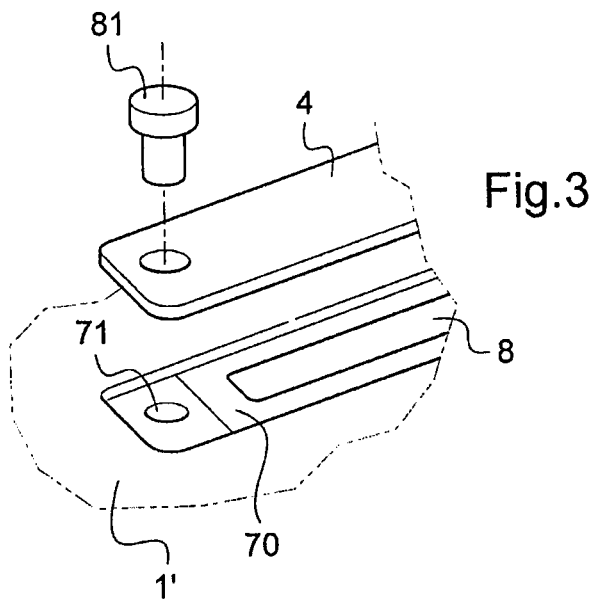
Figure 4:
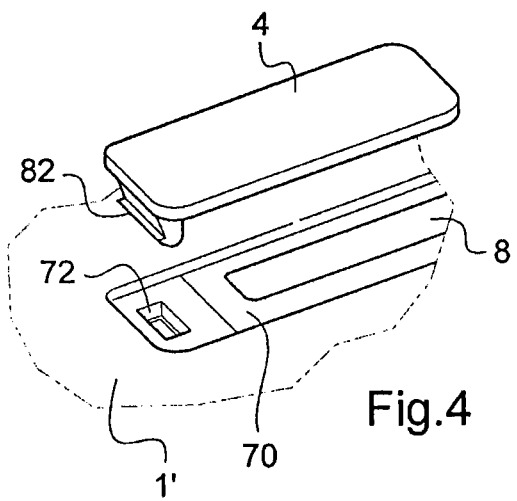

FIGS. 3, 4 show partial schematic elevation views of the fastening means and of a cap according to the invention.

Figure 5:
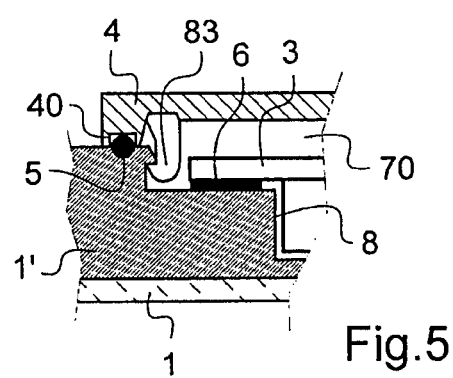

FIG. 5 shows a partial schematic cross-section of the fastening means and of a cap according to the invention.

FIGS. 6 and 8 each show a schematic cross-section of the caps according to the invention.

FIG. 10bis shows a schematic elevation view of the luminous vehicle glazing in the embodiment of the invention in FIG. 10.

FIG. 11bis shows a schematic elevation view of the luminous vehicle glazing in the embodiment of the invention in FIG. 11.

FIG. 12bis shows a schematic plan view of the luminous vehicle glazing in the embodiment of the invention in FIG. 12.

FIG. 12ter shows a partial schematic plan view of the connecting part used in the embodiment in FIG. 14.

FIG. 12quater show a cross-section of the connecting part of the embodiment in FIG. 12.

FIG. 13 shows a partial schematic cross-section of a luminous vehicle glazing 600.

FIG. 13bis depicts a side window, particularly an automobile side window where cap 4 is visible.

FIG. 14 shows a schematic front view of the luminous vehicle glazing.

FIG. 15bis shows a schematic plan view of the luminous vehicle glazing in the embodiment of the invention in FIG. 15.

FIG. 16bis shows a schematic plan view of the luminous vehicle glazing in the embodiment of the invention in FIG. 16.

For the sake of clarity, the various elements of the objects shown are not necessarily reproduced to scale.

FIG. 1 shows a partial schematic cross-section of a luminous vehicle glazing 100 in a first embodiment of the invention.

This glazing 100 is a glazing comprising a first transparent sheet 1, of organic glass, for example rectangular, having a first main face 11 and a second main face 12, and an edge 10, for example a bimaterial transparent and opaque polycarbonate sheet.

Two support sections 3 of light emitting diodes 2 extend on the border, for example longitudinal border, and are fastened on the periphery of the second face 12 of the first glass sheet 1 by a bonding 6 or a two-sided adhesive.

Each support section 3 is monolithic, thin, having a thickness of 0.6 mm (preferably 5 mm max), 7 mm wide, 20 cm long. It may have a rectangular section, and be made of metal or a conventional PCB. The bearing length of the section on the second face 12 may typically be lower than 7 mm.

As an alternative, the diode support section has an L, U, J cross-section, etc.

More precisely, the diodes are in a hole 8 (groove) made in the opaque zone 1' of the first sheet (1) on the periphery of the second face (12) and the support section 3 bears in a cavity 70 that is wider than the groove.

The opaque zone forms a masking of the source 2, by extending on the second face masks any interfering light, in particular close to the injection side 14, and/or forms a masking of the fastening 91 of the glazing to the vehicle body 90 by the second face 12.

The light emitting diodes each comprise an emitter chip 2 for emitting one or more radiations in the visible guided in the first sheet 1. The diodes are small, typically measuring a few mm or less, in particular about 2×2×1 mm, without optics (lens) and preferably not pre-encapsulated to reduce the size to the maximum.

In the configuration shown, the emitting face 21 is lateral (parallel to the section 3). The distance between the side emitting face and the injection side 14 is reduced to the maximum, for example 5 mm. The distance between the side emitting face and the edge is 1 to 2 mm. The main emission direction is perpendicular to the face of the semiconductor chip, for example with an active layer having multi-quantum wells, of AlInGaP technology or other semiconductors. The light cone is a +/−60° Lambertian cone.

The light extraction 12' can be carried out via the second face 12 which is, for example, the inner face of the vehicle, particularly in the case of a roof.

The extraction 12' is carried out by any diffusion means on the surface of the second face 12: sandblasting, acid attack, diffusing layer, screen printing . . . or alternatively, by laser etching in the first sheet 1.

For a given group of diodes, an emitted radiation space is defined between each diode (chip) and the injection side of the first sheet, called optical coupling space, which is preferably a gaseous medium, typically air.

Each chip and the emitted radiation space must be protected against pollution: water, chemical, etc., for the long-term and also during manufacture of the glazing 100.

To guarantee the fluid-tight of each chip, of each diode array, the following are used:
- a cap (4) for covering the diodes (for example one cap per array), the facial cap having a general so-called inner face oriented toward the first sheet,
- an interfacial element 5 for the interfacial fluid-tight sealing, arranged between the inner face of the cap and the second face 12 close to the cavity 70, which is a seal, made from EPDM, in the form of a 5 mm wide strip, in a groove 40 on the inner face of the cap, or alternatively on the first sheet.

The cap is a plastic part having a general planar shape, with a rectangular contour (with optionally rounded sides) as shown in FIG. 2 or FIG. 7. The cap is parallel to the first sheet.

As shown in FIGS. 2 and 3, the cap is joined to the first sheet 1 by reversible fastening means, for example two screws 81, passing through the cap and extending from the inner face.

These screws are accommodated in host zones of the first sheet 1, that is to say, threaded holes 71 and preferably between the sealing strip and the side of the cavity 70.

The interfacial sealing element 5 is a compressed material, the compressive sealing of the material being obtained by a closure force of said cap fastening means 81.

The cap is thus easily demountable to insert the diodes or replace them.

In a first cap alternative, shown in FIG. 4, the cap fastening means are two clipping means 82 received in host zones 72, preferably between the sealing strip and the side of the cavity.

In another cap alternative, shown in FIG. 5, the cap fastening means are two clipping means 83 received in inner sides bounding the cavity 70.

In a cap alternative (alternative or cumulative) shown in FIGS. 6 and 7, the support section 3 of the LEDs 2 is secured by the cap for example by hooks 50'.

The cap design thereby allows the integration of the diode array and also allows the focusing of the array, that is to say, the proper positioning of the array with regard to the injection edge.

The cap may further comprise surfaces or stops for reference in the housing of the overmolding.

Furthermore, the cap is provided with a cavity 50 (made fluid-tight by foam or seal, etc.) for the passage of the connections, etc.

In a third cap alternative (alternative to the second alternative) shown in FIG. 8, the inner face is provided with a (precise) positioning/alignment means 60 of the diode support section (3), in the form of a pusher (concave shape facing the opposite of the sheet 1) bearing on the outermost face of the section.

The design of the cap 4 hence comprises an element 60 for applying a force to the diode array previously fixed to the sheet.

Diodes emitting white or colored light can be selected for ambience lighting, reading lighting, etc.

A plurality of supports can obviously be provided on distinct sides, and/or with distinct functions (choice adapted to the power, the light emitted, the position and extent of the extraction zones).

The extraction, for example, a diffusing layer 12' can form an ambience lighting.

The glazing 100 may, for example, form a fixed sun roof of a land vehicle, or alternatively a boat, etc. The roof is mounted from the outside, on the body 90 via an adhesive 91.

The first sheet is on the inside of the vehicle. Extraction is preferably by the face 12.

FIG. 1*ter* shows a partial schematic cross-section of the luminous vehicle glazing in an alternative of the embodiment of the invention in FIG. 1.

The luminous vehicle glazing differs from the glazing 100 by the position and type of interfacial sealing element.

In fact, this is a seal 51 made from elastomer rubber or TPE; in a groove 41 arranged on the outer side of the cap 4 and in contact with a side of the cavity 70.

The sides of the inner face may simply bear on the first sheet 1" in the opaque zone.

FIG. 9 shows a partial schematic cross-section of a luminous vehicle glazing 200 in a second embodiment of the invention.

The luminous vehicle glazing 200 differs from the glazing 100 first by the arrangement of the fastening means 83 which are clipping means received in the first sheet outside the cavity 70 and the interfacial sealing element 5.

For example, the glazing is provided with a polymer overmolding 7, about 2.5 mm thick, at the edge of the glazing, and preferably on the entire perimeter of the glazing and at least the second face 12.

The overmolding 7 conventionally serves as a good esthetic finish and allows the integration of other elements or functions (reinforcing inserts, etc.).

The overmolding 7 has, for example, a lip seal between the glazing and the vehicle.

The overmolding 7 is made, for example, of black polyurethane, particularly PU-RIM (Reaction In Mold).

FIG. 10 shows a partial schematic cross-section of a luminous vehicle glazing 300 in a third embodiment of the invention.

The luminous vehicle glazing 300 differs from the glazing 100:
- by the extent of the cavity 70 extending up to the edge 10 and further being on the perimeter of the first sheet as shown in FIG. 10*bis*,
- by the use of a double sealing strip 5 (low recessed zone and high unrecessed zone of the second face 12),
- the fastening means are reversible, comprising clipping means with
- a first pin 44 in a first host groove 141 on the second main face,
- and a second pin in a second host groove 142 on the edge.

FIG. 11 shows a partial schematic cross-section of a luminous vehicle glazing 400 in a fourth embodiment of the invention in an alternative of the glazing 300.

The double sealing strip is replaced by reversible glue 91' and the cap rests on the recessed portion. The cavity 70 is partial as shown in FIG. 11*bis*. The lateral ends may be plugged with preferably reversible glue.

FIG. 12 shows a partial schematic cross-section of a luminous vehicle glazing 500 in a fifth embodiment of the invention.

The luminous vehicle glazing 500 differs from the glazing 100 by the choice of a laminated glazing:
- with the first sheet of soda lime glass, 2.1 mm thick,
- a second glass sheet 17, optionally for a solar control function, tinted (VENUS VG10 glass for example) and/or covered with a solar control coating, 2.1 mm thick.

The second glass sheet is laminated 1' by a lamination interlayer 8, for example a 0.76 mm thick PVB 81.

To mask the source, or even eliminate the interfering light exiting via the sheet 17, a peripheral masking element 15 can be used on the face 13, for example an opaque enamel (black, etc.) and/or a reflector (silvered, etc.) for example forming a frame as shown in FIG. 12*bis*.

This peripheral masking element 15 may also serve to mask the fastening to the body.

The cap 4, fixed indirectly to the second face 12, is fixed to a connecting part 7' in the form of a frame placed on the first sheet 1, for example oval. The first face has no cavity.

The interfacial seal 5 is arranged between the inner face of the cap and the free outer face of the connecting part 7' of PP, PA66 or PBT material.

The reversible cap fastening means are clipping means, for example point means, and arranged on the inner face of the cap, for example four clipping pins forming an integral part of the cap (cf. FIG. 12*quater*). The inner face of the cap therefore has pin-free zones 43. Stops 50" are preferably used for proper protection or positioning of the diode 3.

The clipping means 83 are clipped to the interior of the connecting part 7', or alternatively to the exterior.

Alternatively, the connecting part is bonded to the first sheet (and/or to the overmolding).

FIG. 13 shows a partial schematic cross-section of a luminous vehicle glazing 600 in a sixth embodiment of the invention.

The glazing 600 differs from the glazing 100 by:
its fastening to the body 90 by glue 91 is on the first face 11
the second face 12 is the outer face of the vehicle
the cavity 70 is a single groove 8 and the opaque zone is in face 11 only.

This concerns, for example, a side window, particularly an automobile side window, as shown in FIG. 13*bis*.

Here the cap is visible and also serves as an appearance part, trim, with a curved shape for example.

FIG. 14 shows a partial schematic cross-section plan view of a luminous vehicle glazing 700.

This concerns, for example, a rear window of a vehicle:
with a luminous zone 12' on the outer face 11, hence seen from the exterior (means for locating the vehicle, stop lights, etc.),
with a luminous zone 12" on the inner face 12, hence for the interior.

FIG. 15 shows a partial schematic cross-section of a luminous vehicle glazing 700 in a seventh embodiment of the invention.

There is no cavity in the first sheet. The cap is angular, rests on one side on a three-face peripheral overmolding 7 and on the second face 12. The sealing and the fastening of the cap are provided by glue, preferably reversible, which is placed between the ends as shown in FIG. 15*bis*.

FIG. 16 shows a partial schematic cross-section of a luminous vehicle glazing 800 in an eighth embodiment of the invention.

The glazing 12 differs from the glazing 500 by the fact that the connecting part is partly bonded to the peripheral overmolding (set in the overmolding), which may be three-face, and by the position of the more internal clipping means.

Alternatively, the diodes are replaced by an optical fiber with a lateral emitting face, fiber installed (wedged), for example by a support section, on the second face. The primary light source may be a diode (not shown). The optical fiber from 3M called 3M™ Precision Lighting Elements is used for example.

Alternatively, LED UVs are selected, particularly in the UVA, to excite the luminophores on the face 12, for example preferably for a glass sheet.

The invention claimed is:

1. A glazing, comprising:
a first sheet comprising mineral or organic glass comprising a first main face, a second main face, and an edge;
a peripheral light source comprising an emitting face selected from the group consisting of an optical fiber and light emitting diodes that comprises a semiconductor chip on a support section of the diodes, the emitting face facing a side of the second main face, which is an injection side for a propagation of an injected visible and/or ultraviolet (UV) light into the thickness of the first sheet, which guides injected light;
a zone, which is made luminous by injected light or UV, formed by
a surface diffusion extractor of the first and/or second main face, each of which extracts guided light via the first and/or the second main face, or
a volume diffusion extractor in the first sheet, and/or a luminophore on the first and/or second main face, each of which converts injected UV light to visible light via the first and/or the second main face;
a fluid-tight cap, which covers the peripheral light source and is impermeable to liquid water or water vapor, wherein the fluid-tight cap essentially faces the second face, and is joined by a fastening element to the first sheet, and/or to a connecting part or element bound to the first sheet,
wherein the cap is in contact with or integrated with an interfacial sealing element that is impermeable to liquid water or water vapor and comprises an inner face oriented toward the second main face; and
wherein, optionally, said glazing comprises a peripheral functional element bonded to the first sheet, which is a fluid-tight overmolding or a fluid-tight preassembled element.

2. The glazing of claim 1, further comprising:
a masking element, which masks the source and any interfering light, and/or which masks a fastener of the glazing to a vehicle body by the second face, wherein the masking element is:
a part of the functional element, and/or
an opaque enamel on a periphery of the second face and/or on the first face or a face of an added sheet film facing the first face when the functional element is one-sided or two-sided, and/or
a reflecting surface on the periphery of the second face and/or on the first face or an added face facing the first face.

3. The glazing of claim 1, wherein the first sheet is an organic, transparent and opaque bimaterial and an opaque zone of the first sheet on the periphery of the second main face and/or on the main first face, forms a masking of the peripheral light source and of any interfering light, and/or forms a masking of a fastening of the glazing to a vehicle body by the second face.

4. The glazing of claim 1, wherein the interfacial sealing element is a reversible glue, forming a part of or constituting the cap fastening element, which is reversible and arranged in a gasket in contact with the inner face of the cap or the connecting part or the second face.

5. The glazing of claim 1, wherein the interfacial sealing element is a compressed material the compressive sealing of the material being provided by a closure force of the interfacial sealing element, which is selected from the group consisting of:
a polymer seal comprising TPE or EPDM, with lip seal(s);
a polymer sealing section on the connecting part, or on the cap; and
a foam, optionally adhesive, selected from the group consisting of an acrylic foam, PU, rubber, thermoplastic elastomer, TPE, and polyester.

6. The glazing of claim 1, wherein the fastening element is reversible, and is selected from the group consisting of:
a clipping element arranged on the cap, and received for clipping in a host zone in the first sheet and/or of the connecting part and optionally further received in the functional element;
a hook clipping element, forming an integral part of the cap, received in a host zone of the first sheet and/or of the connecting part and optionally further received in the functional element; and a screw.

7. The glazing of claim 1, wherein the connecting part forms a recessed single-face part comprising a closed contour.

8. The glazing of claim 1, wherein the cap is a trim, or the cap is masked after fastening the glazing to a vehicle body.

9. The glazing as of claim 1, wherein the cap comprises a securing element, which secures the support section and/or a cavity for the passage of the connections and/or a positioning element, which positions the support section of the diodes.

10. The glazing of claim 1, wherein the glazing is single, the first sheet comprising mineral or organic glass, and optionally bimaterial.

11. The glazing of claim 1, further comprising:
a second sheet comprising mineral or organic glass, which is laminated by a lamination interlayer to the first sheet,
wherein the edge of the first sheet comprises a marginal through cavity where the peripheral light source is housed, or the second sheet extends beyond the injection side of the first sheet, creating a side setback of the glazing.

12. The glazing of claim 1, wherein the functional element is duplicate molded and polymeric, and
wherein the glazing comprises, between the encapsulation and the glazing-a layer comprising mono-, bi-, or tri-component primer comprising a polyurethane, polyester, polyvinyl acetate, or isocyanate.

13. The glazing of claim 1, the glazing being selected from the group consisting of:
a side window of an automobile, utility vehicle, truck, or train, wherein the functional element is a securing part of a window raising system or with the trim cap;
a sliding or fixed roof of an automobile, utility vehicle, or truck, train, comprising a first optionally cambered sheet;
a windshield of an automobile, utility vehicle, truck, or train, with the light zone or zones in an enamel frame or nearby, or a rear window in the enamel frame or nearby;
a window or windshield of an aerial vehicle;
a glazing for a window or a roof of an aquatic vehicle, ship, or submarine; and
a double or triple glazing in a train or a bus.

14. A vehicle comprising the glazing of claim 1.

15. The glazing of claim 1, wherein the injection side of the first sheet is partly recessed or comprises a setback.

16. The glazing of claim 1, further comprising a peripheral functional element bonded to the first sheet, which is a fluid-tight overmolding or a fluid-tight preassembled element.

17. The glazing of claim 1, wherein the cap is associated with an interfacial sealing element for the fluid-tight interfacial sealing, which is impermeable to liquid water or water vapor, and which is arranged between the cap and the connecting part and optionally between the cap and the peripheral functional element or integrated with the cap, or integrated with the connecting part or integrated with the first sheet.

18. The glazing of claim 1, wherein the fluid-tight cap is removable, demountable or repositionable.

19. The glazing of claim 1 which is nonlaminated organic glass and which further comprises a black or dyed peripheral thermoplastic functional element.

20. The glazing of claim 1, wherein the first sheet comprises an organic glass comprising a blind hole in its thickness of the second face, which houses the peripheral source facing the injection side.

21. The glazing of claim 20, wherein the hole is on the entire perimeter of the second main face and the cap forms a frame.

22. The glazing of claim 1, wherein a coupling space, which is a space of the radiation emitted before injection, is gaseous, local, and on the periphery of the inner face of the cap or on one side of the cap.

23. The glazing of claim 22, wherein the source is fastened to the glazing outside the coupling by fastening the support section to one of the faces of the first sheet or to the inner face of the cap.

24. A luminous vehicle glazing, comprising:
a first sheet comprising mineral or organic glass comprising a first main face, a second main face, and an edge;
a peripheral light source comprising an emitting face selected from the group consisting of an optical fiber and light emitting diodes that comprises a semiconductor chip on a support section of the diodes, the emitting face facing a side of the second main face, which is an injection side for a propagation of an injected visible and/or ultraviolet (UV) light into the thickness of the first sheet, which guides injected light;
a luminous zone, which is made luminous by injected light or UV, formed by
a surface diffusion extractor of the first and/or second main face, each of which extracts guided light via the first and/or the second main face, or
a volume diffusion extractor in the first sheet, and/or a luminophore on the first and/or second main face, each of which converts injected UV light to visible light via the first and/or the second main face;
a fluid-tight cap, which covers the peripheral light source and is impermeable to liquid water or water vapor, wherein the fluid-tight cap essentially faces the second face, and is joined by a fastening element to the first sheet, and/or to a connecting part or element bound to the first sheet,
wherein the cap is in contact with or integrated with an interfacial sealing element that is impermeable to liquid water or water vapor and comprises an inner face oriented toward the second main face;
wherein the first sheet comprises an organic glass comprising a blind hole in its thickness of the second face, which houses the peripheral source facing the injection side.

25. A luminous vehicle glazing, comprising:
a first sheet comprising mineral or organic glass comprising a first main face, a second main face, and an edge;
a peripheral light source comprising an emitting face selected from the group consisting of an optical fiber and light emitting diodes that comprises a semiconductor chip on a support section of the diodes, the emitting face facing a side of the second main face, which is an injection side for a propagation of an injected visible and/or ultraviolet (UV) light into the thickness of the first sheet, which guides injected light;
a luminous zone, which is made luminous by injected light or UV, formed by
a surface diffusion extractor of the first and/or second main face, each of which extracts guided light via the first and/or the second main face, or
a volume diffusion extractor in the first sheet, and/or a luminophore on the first and/or second main face, each of which converts injected UV light to visible light via the first and/or the second main face;
a fluid-tight cap, which covers the peripheral light source and is impermeable to liquid water or water vapor, wherein the fluid-tight cap essentially faces the second face, and is joined by a fastening element to the first sheet, and/or to a connecting part or element bound to the first sheet, wherein the cap is in contact with or integrated with an interfacial sealing element that is impermeable to liquid water or water vapor and comprises an inner face oriented toward the second main face;

wherein the first sheet is an organic, transparent and opaque bimaterial and an opaque zone of the first sheet on the periphery of the second main face and/or on the main first face, forms a masking of the peripheral light source and of any interfering light, and/or forms a masking of a fastening of the glazing to a vehicle body by the second face.

\* \* \* \* \*